Oct. 31, 1933.                P. H. HENKEL                1,932,821
MACHINE FOR IMPRESSING PATTERNS ON EXTRUDED MATERIAL
Filed Oct. 17, 1930
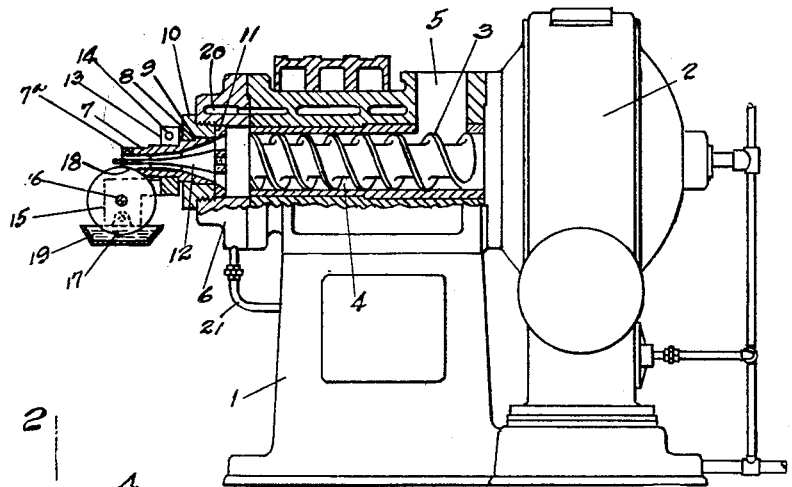
FIG. 2
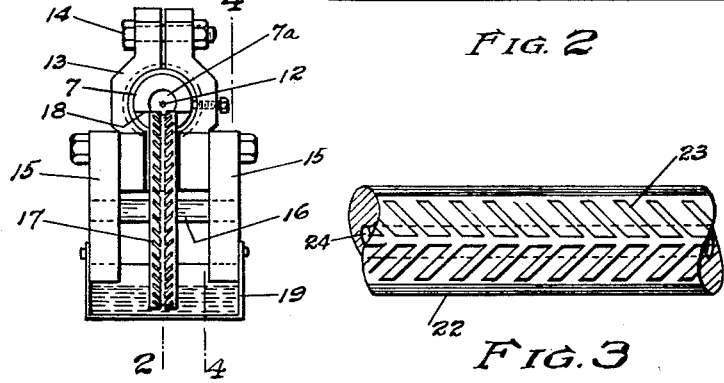
FIG. 1
FIG. 3
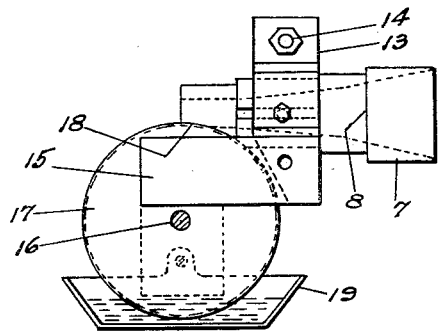
FIG. 4
Paul H. Henkel
INVENTOR.
BY H.Z. Ford
ATTORNEYS.

Patented Oct. 31, 1933

1,932,821

UNITED STATES PATENT OFFICE 1,932,821

MACHINE FOR IMPRESSING PATTERNS ON EXTRUDED MATERIAL

Paul H. Henkel, Erie, Pa., assignor to Continental Rubber Works, Erie, Pa., a corporation of Pennsylvania Application October 17, 1930. Serial No. 489,328

1 Claim. (Cl. 18—12)

In the extruding of certain materials, such as rubber goods, the pattern on the material has heretofore has been limited to patterns involving longitudinal ribs. With many extruding materials it is desirable to provide patterns having cross shoulders and the present invention is designed to accomplish this purpose. Features and details of the invention will appear from the specification and claim.

A preferred embodiment of the invention is illustrated in the accompanying drawing as follows:—

Fig. 1 shows an end view of the nozzle structure of the extruding device.

Fig. 2 is a side elevation, partly in section, showing a tubing machine.

Fig. 3 a plan view of a fragment of the extruded stock.

Fig. 4 a section on the line 4—4 in Fig. 1.

1 marks the base of the tubing machine, 2 a motor, 3 an extruding screw, 4 a chamber in which the screw operates, 5 a feeding inlet to the chamber 4, and 6 a head secured at the end of the chamber 4. These are of ordinary construction.

A tubing die, or nozzle 7, has a shoulder 8 which engages a shoulder 9 on a clamping ring 10, the clamping ring being screwed into the end of the head 6. A core-holding plate 11 is also secured by the ring 10. It has the protruding core-forming pin 12 which projects from the plate, the plate having the usual openings for the passage of material. A split clamping ring 13 is arranged around the nozzle 7 and is clamped in position by a bolt 14. It has the forwardly extending arms 15 which carry a pin 16 journaled in the arm and a pattern wheel 17 is fixed on the pin.

The end of the nozzle is cut away at 18 so that one side of the extruding passage 7a is exposed and the pattern wheel 17 fits into and closes this opening. A small pan 19 is hung on the arms 15 and contains a lubricating material, such as soap-suds. The pattern wheel runs through this lubricating material which coats the pattern wheel with the soap-suds.

In operation, the rubber, or similar material is extruded by the screw through the extruding passage 7a in the usual manner. As the material passes the wheel the wheel progressively impresses its pattern on the material. I have shown in Fig. 3 a fragment of a tire 22, the tread of which has a pattern 23 and which is provided with a longitudinal opening 24 for receiving a securing wire (not shown).

The soap-suds lubricates the wheel and also slightly cools the wheel and by reason of this adhesion between the wheel and proper rubber stocks is avoided. It is desirable, in order to get the best results, that the temperature of the extruding stock shall be controlled, and to this end, I have provided the water jackets 20 which receive cool water through a pipe 21.

It will be noted that the pattern is impressed progressively as the stock is extruded and that the wheel is rotated through the pressure, or engagement of the moving stock upon it. Thus with a very simple mechanism any desired pattern having cross shoulders, as distinguished from longitudinal ribs, may be impressed upon and formed in this tubing machine.

What I claim as new is:—

In an extruding machine, the combination of a nozzle; a pattern wheel extending into the path of the material as it is extruded and adapted to impress its pattern on the material as it is extruded; and a liquid containing receptacle into which the pattern wheel extends.

PAUL H. HENKEL.